United States Patent [19]

Atsuta et al.

[11] Patent Number: 4,834,514

[45] Date of Patent: May 30, 1989

[54] ZOOM LENS MOUNT ASSEMBLY

[75] Inventors: Toshikatsu Atsuta; Shiroshita Hirotaka; Fumio Shinzawa, all of Tokyo; Eiki Matsuo, Nagano; Toshiaki Koinuma, Tokyo, all of Japan

[73] Assignee: Kyocera Corporation, Kyoto, Japan

[21] Appl. No.: 102,102

[22] Filed: Sep. 29, 1987

[30] Foreign Application Priority Data

| Sep. 30, 1986 [JP] | Japan | 61-229609 |
| Sep. 30, 1986 [JP] | Japan | 61-229610 |
| Oct. 24, 1986 [JP] | Japan | 61-162178[U] |
| Jan. 14, 1987 [JP] | Japan | 62-4353[U] |
| Feb. 25, 1987 [JP] | Japan | 62-40108 |

[51] Int. Cl.$^4$ .................. G02B 15/00; G02B 7/04
[52] U.S. Cl. ..................... 350/429; 350/255; 354/195.11
[58] Field of Search ............ 350/429, 430, 255; 354/286, 274, 195.11

[56] References Cited

U.S. PATENT DOCUMENTS

| 3,744,884 | 7/1973 | Filipovich et al. | |
| 4,255,020 | 3/1981 | Yukio | 350/430 |
| 4,307,951 | 12/1981 | Saito et al. | 350/255 |
| 4,466,019 | 8/1984 | Sakashita | 354/286 |
| 4,506,959 | 3/1985 | Hama | 350/430 |

Primary Examiner—John K. Corbin
Assistant Examiner—Loha Ben
Attorney, Agent, or Firm—Spensley Horn Jubas & Lubitz

[57] ABSTRACT

The present invention relates to a zoom lens mount assembly for use in optical apparatus such as photographic camera, video camera or the like. The zoom lens mount assembly of this type usually comprises a plurality of frames consisting of a stationary frame and movable frames assembled into a multilayered frame structure. The present invention provides a novel and improved zoom lens mount assembly in which the innermost layer is constructed from a plurality of frames into a single-layered structure and thereby an inner diameter of the lens mount assembly is dimensioned as largely as possible without making the lens mount assembly as a whole bulky. The present invention also permits the cam frame to be molded of synthetic resin material or the like and permits this cam frame to be mounted in a bayonet fashion.

6 Claims, 14 Drawing Sheets

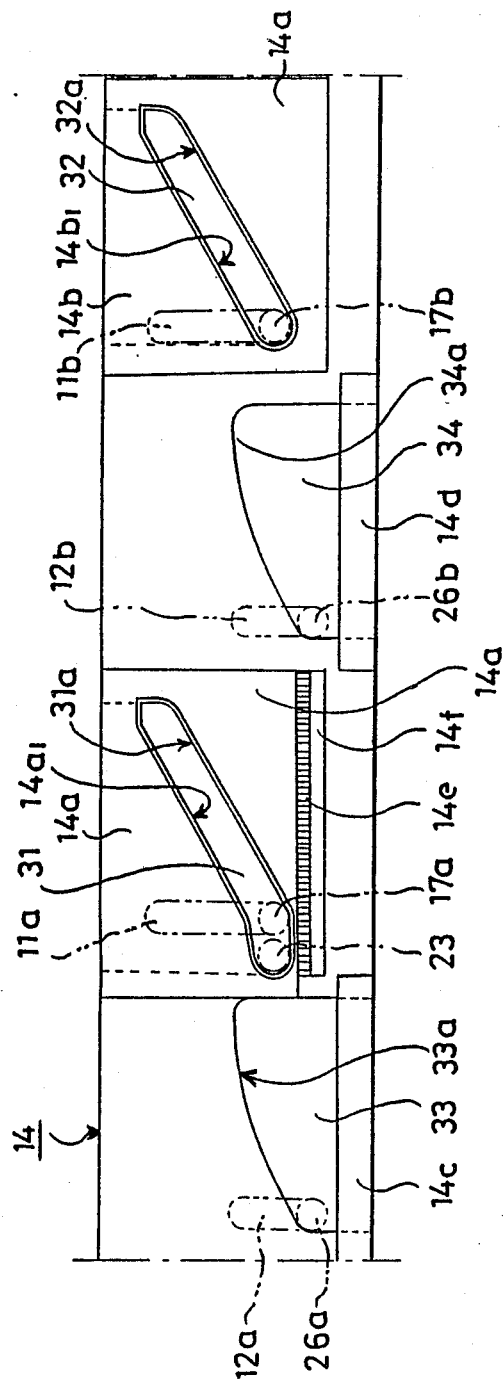

ZOOM LENS MOUNT ASSEMBLY

BACKGROUND OF THE INVENTION

1. Field of the invention:

The present invention relates to a zoom lens mount assembly for use in optical apparatus such as photographic camera, handy motion picture camera, video camera, copying machine or enlarger.

2. Background art:

The zoom lens mount assembly of well known art for use in the optical apparatus such as the photographic camera or the video camera principally comprises the cam sleeve having the elongate cam tracks extending circumferentially therearound and the movable sleeve having the cam followers (i.e., the pins provided with the rollers) extending through said cam tracks and movably supported inside said cam sleeve so that the optical system carried by said movable sleeve can be magnification-varied as said movable sleeve is moved in parallel to the optical axis by rotationally driving said cam sleeve.

In practice, a plurality of said movable sleeves are provided inside the cam sleeve so that the respective movable sleeves are guided by the stationary sleeve and moved in operative association with the cam sleeve.

The zoom lens mount assembly of this type is, however, disadvantageous in that the outer diameter of the lens mount assembly will become inconveniently large when it is desired to obtain a given inner diameter thereof and the inner diameter of the lens mount assembly will be unacceptably reduced when it is desired to limit the outer diameter thereof, because this zoom lens mount assembly is of a multi-layered cylindrical construction.

Additionally, in view of the fact that said cam tracks of the cam sleeve are defined by elongate slots extending circumferentially therearound, it is difficult to obtain this cam sleeve by molding of synthetic resin material and, in consequence, the cam sleeve has usually been made of metallic material. This inevitably reduces the efficiency of production and increases the cost of parts.

However, the cam sleeve molded from synthetic resin material is known, for example, from U.S. Pat. No. 3,744,884.

According to this U.S. Patent, the cam surface portion 20 of the first barrel portion 16 forms in cooperation with the cam surface portion 40 of the second barrel portion 24 the first cam track 44 along which the cam stud 54 of the lens carrier body 50 is moved. The width of the cam track is given by the spacer members 36. Similarly, the cam surface portion 60 of the first barrel portion 16 forms in cooperation with the cam surface portion 66 of the third barrel portion 62 the second cam track along which the cam stud 80 of the lens cell 76 is moved.

Displacement of the lens is achieved by moving the sleeve 90 by operation of the control handle 100.

The arrangement disclosed by this U.S. Patent is inconvenient in that the number of parts is relatively many since the cam barrel comprises three barrel portions (16, 24, 62) and, in addition, a desired high precision of the cam cannot be expected because these three barrel portions (16, 24, 62) are secured together by use of screws.

Furthermore, the first, second and third barrel portions include their respective cam surface portions defined by the notches and, therefore, these barrel portions are necessarily deformed during a post-shrinkage process of molding. This deteriorates the true circularity of the respective barrel portions and also reduces the cam precision.

SUMMARY OF THE INVENTION

The present invention relates to a zoom lens mount assembly for use in optical apparatus such as photographic camera, handy motion picture camera, video camera, copying machine or enlarger.

A first object of the invention is to develop a zoom lens mount assembly permitting its inner diameter to be dimensioned as large as possible without making the lens mount assembly bulky as a whole. This object is achieved, in accordance with the present invention, by constructing the innermost frame as a single-layered frame structure comprising a plurality of frame portions and thereby reducing the number of frame layers included in the lens mount assembly.

A second object of the invention is to reduce a fabrication cost of the lens mount assembly to a level as low as possible. This object is achieved, according to the present invention, by enabling a cam sleeve adapted to move a movable frame serving to carry an optical system to be molded from synthetic resin material. Specifically, there is provided a cam sleeve comprising a cylindrical body having a front cam slot in the form of a notch which opens at a front end and a rear cam slot in the form of a notch which opens at a rear end of said cylindrical body so that the cam sleeve can be conveniently molded from synthetic resin material.

A third object of the invention is to prevent the movable frame operatively associated with the cam sleeve from being unintentionally displaced. Said cam slots of the cam sleeve are formed as the notches respectively opening at the opposite ends of said cylindrical body and edge walls of these notches function as cam surfaces. Cam followers of the movable frame which carries the optical system are normally biased under action of a spring against said respective cam surfaces. In such arrangement, should any unintentional force be exerted, for example, by the user's finger to the movable frame, this movable frame would be possibly displaced against said action of the spring and result in an erroneous zooming. According to the present invention, such inconvenience is overcome, namely, said third object is achieved by providing a single or a pair of covering plate portion(s) adapted to cover both or any one of said front and rear cam slots around the cam sleeve and partially providing this or these covering plate portion(s) with cam-surface-parallel-wall(s) extending in parallel to said cam surface(s).

A fourth object of the invention is to permit the cam sleeve to be incorporated in the bayonet mode. This object is achieved, in accordance with the present invention, by providing the cam sleeve with flange portions partially extending therearound adjacent the rear end thereof, and forming square grooves, locking pawl portions extending into said grooves and stopper portions around the base of a stationary frame around which said cam sleeve is received, said stopper portions serving to limit a rotatable range of the cam sleeve after the flange portions have been received in the respective square grooves of the stationary frame.

BRIEF DESCRIPTION OF THE DRAWINGS

FIGS. 1 through 16 illustrate a first embodiment of the present invention in which:

FIG. 1 is a sectional side view of a zoom lens mount assembly;

FIG. 2 is a sectional plan view of the same zoom lens mount assembly;

FIG. 3 is a disassembled perspective view of the same zoom lens mount assembly;

FIG. 4 is a developed view of a cam sleeve;

FIG. 5 is a scale-reduced sectional view taken along a line A—A in FIG. 1 but with a movable sleeve and the cam sleeve being left out;

FIG. 6 is a partial perspective view of a stationary frame;

FIG. 7 is a scale-reduced sectional view taken along a line A—A in FIG. 1;

FIG. 8 is a partial view with respect to FIG. 1, illustrating a cam follower portion in an enlarged scale;

FIG. 9 is a view similar to FIG. 8, illustrating a variant of the cam follower portion;

FIG. 10 is a sectional side view of said zoom lens mount assembly as has been transferred from its wide angle position to its telescopic position;

FIG. 11 is a view similar to FIG. 4, illustrating a variant of the cam sleeve;

FIG. 12 is a view similar to FIG. 8, illustrating the cam follower portion as incorporated with the cam sleeve of FIG. 11, in an enlarged scale;

FIG. 13 is a front view of a shutter in its opened state;

FIG. 14 is a front view of the shutter in its closed state; FIG. 15 is a rear view of a lens carrier provided with a shutter drive; and FIG. 16 a plan view of an electromagnetic drive mechanism functioning as said shutter drive.

FIGS. 17 through 20 illustrate a second embodiment of the present invention in which:

FIG. 17 is a sectional side view of a zoom lens mount assembly;

FIG. 18 is a sectional plan view of the same zoom lens mount assembly;

FIG. 19 is a scale-reduced sectional view taken along a line B—B in FIG. 17; and FIG. 20 is a scale-reduced sectional view taken along a line C—C in FIG. 17.

DESCRIPTION OF THE PREFERRED EMBODIMENTS

Figure 1:
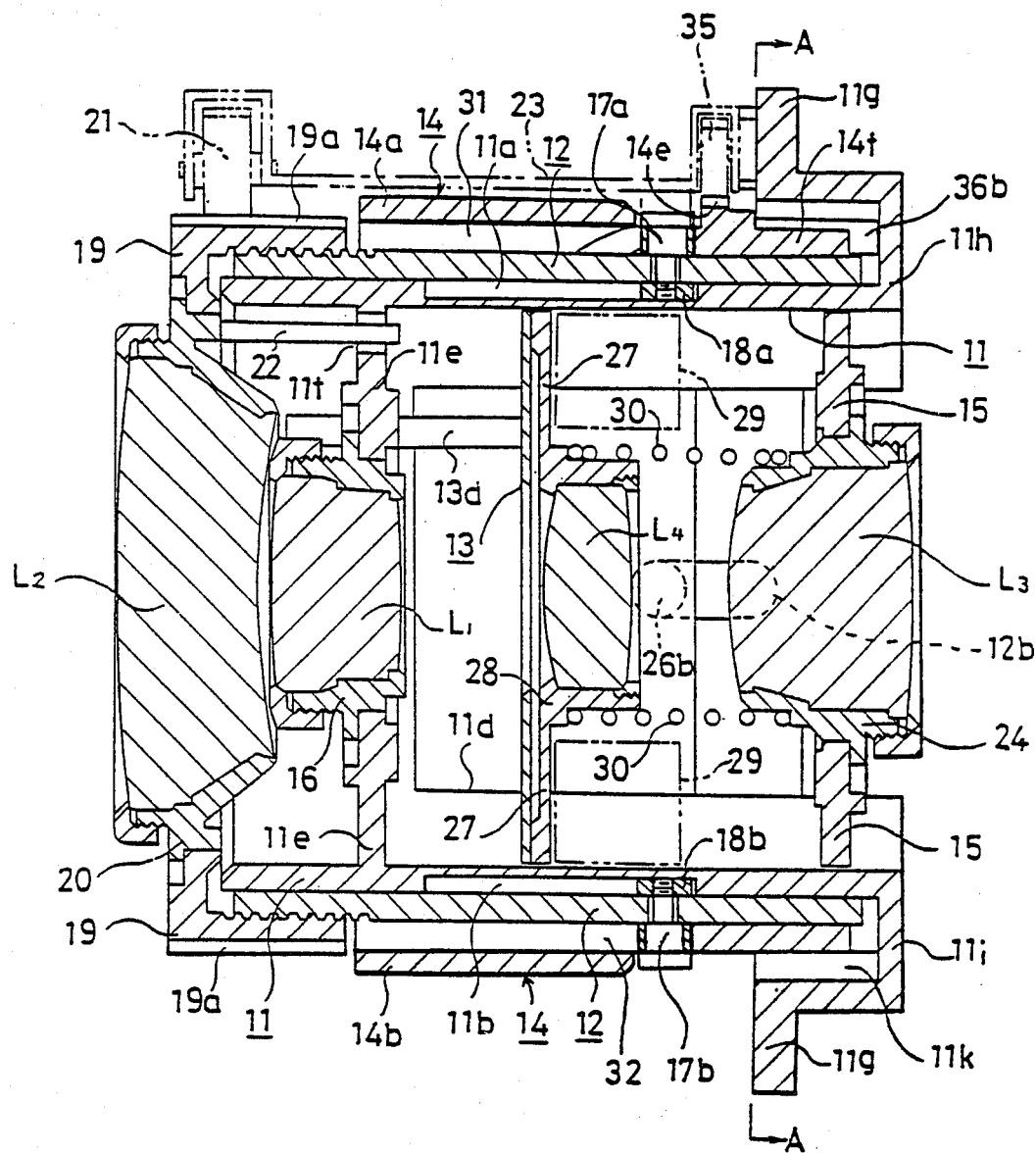
Figure 2:
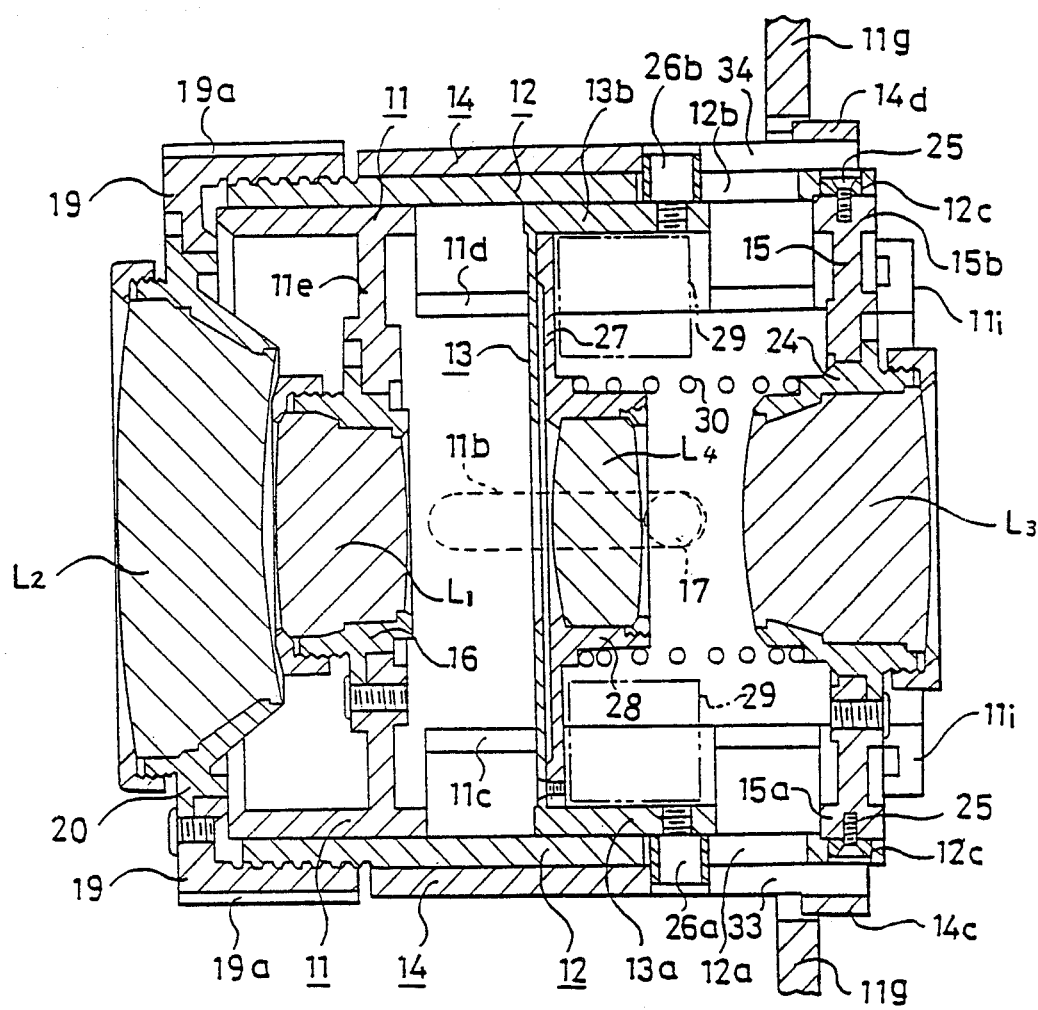
Figure 3:
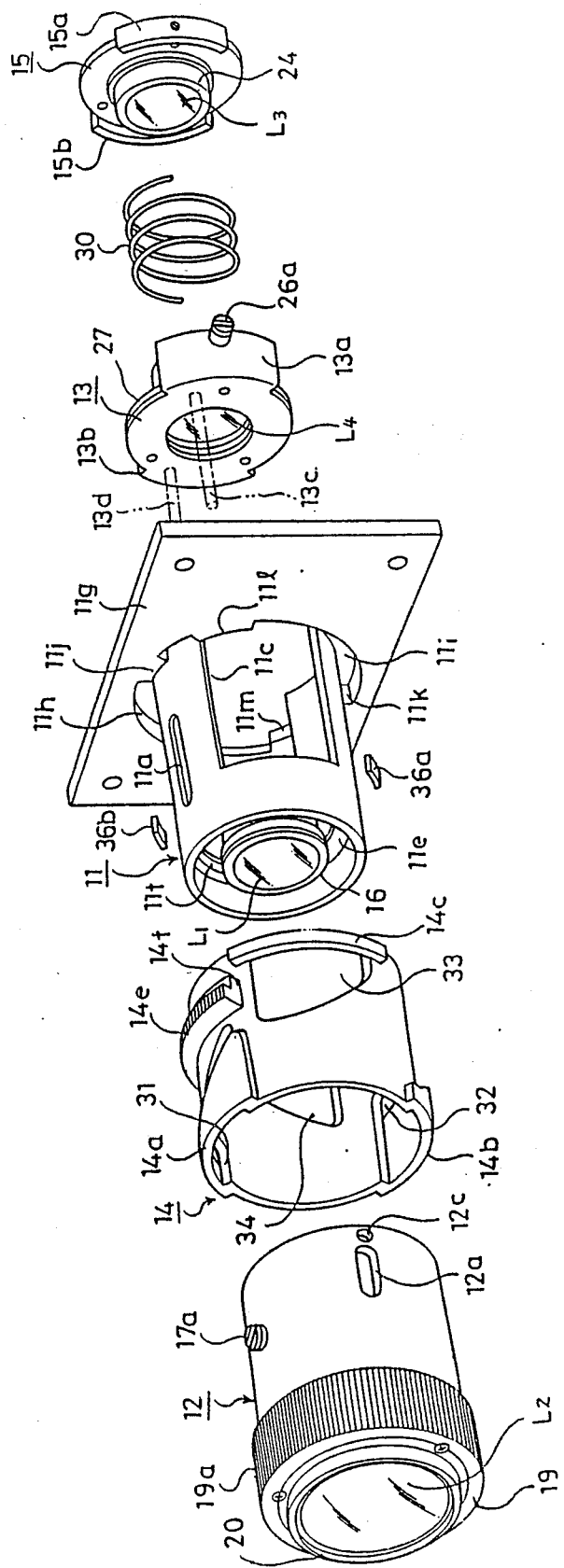

FIGS. 1 through 16 illustrate a first embodiment of the present invention. Referring to FIGS. 1 through 3, reference numeral 11 designates a cylindrical stationary frame mounted on a camera body or the like, 12 a movable sleeve adapted to be moved around the outer surface of the stationary frame 11, 13 a movable frame adapted to be moved inside the stationary frame 11, and 14 a cam sleeve rotatably mounted on the movable sleeve 12.

$L_1$ designates a stationary lens group, $L_2$ and $L_3$ designate movable lens groups carried by front and rear ends, respectively, of the movable sleeve 12, and $L_4$ designates a movable lens group carried by the movable frame 13. $L_2$ functions as a focussing lens while $L_1$, $L_3$ and $L_4$ respectively function as variable magnification lenses, and, particularly, $L_4$ functions also as a compensating lens.

Said stationary frame 11 is provided in its top and bottom with elongate guide grooves 11a, 11b, respectively, linearly extending in parallel with the optical axis (i.e., the sleeve axis) and in its left and right sides with wide notches 11c, 11d (FIGS. 2 and 3), respectively, extending in parallel with the sleeve axis and opening at their rear ends. The guide grooves 11a, 11b permit the movable sleeve 12 to be unrotatably guided in the direction of the optical axis and notches 11c, 11d permit the movable frame 13 to be moved together with a lens supporting frame 15 in the direction of the sleeve axis.

The stationary frame 11 is further provided integrally therewith adjacent its front end but a little to its middle portion with a partition-like lens supporting portion 11e and a lens holder 16 for the stationary lens group $L_1$ is secured by screws to this supporting portion 11e. Said lens supporting portion 11e is formed with an arc-shaped through-hole 11f into which stopper levers 13c, 13d of the movable frame 13 adapted to limit a rotatable range of the focussing movable lens group $L_2$ are loosely inserted. Details of this feature will be described later.

Figure 5:
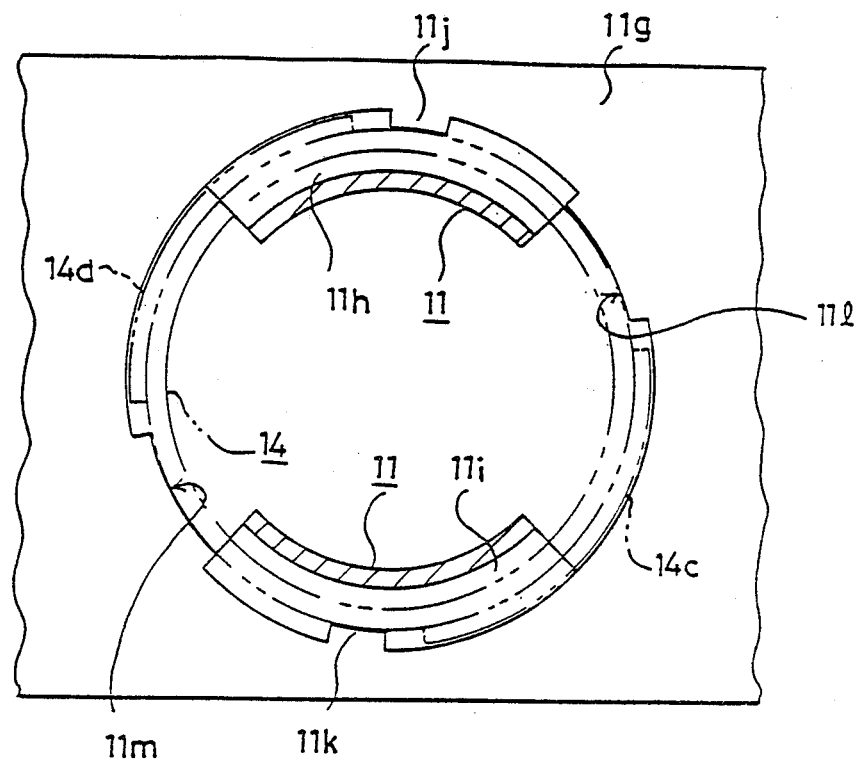
Figure 6:
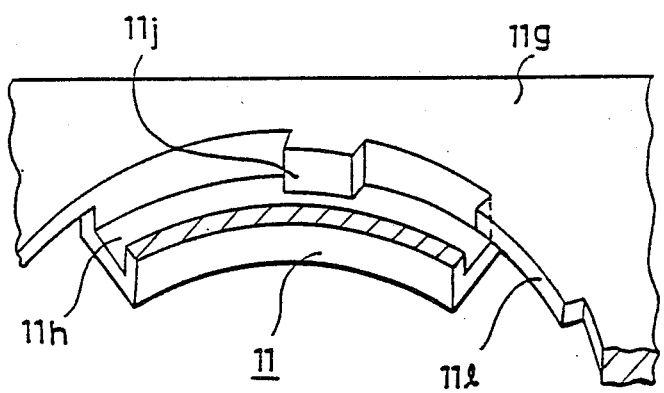

As best seen in FIGS. 5 and 6, between the rear end of said stationary frame 11 and a mounting plate portion 11g there are provided a pair of square groove defining arc-shaped portions 11h, 11i symmetrically to each other, and respective outer walls of these portions 11h, 11i are formed with stopper projections 11j, 11k. In continuation with said respective outer walls, there are provided locking pawls 11l, 11m at mutually symmetric positions.

The locking pawls 11l, 11m are adapted to mount the cam sleeve 14, of which the details will be described later, in a bayonet mode and the stopper projections 11j, 11k serve to limit a rotatable range of the cam sleeve 14. FIG. 5 is a scale-reduced sectional taken along a line A—A in FIG. 1 with the movable sleeve 12 and the cam sleeve 14 being left out for simplicity, and FIG. 6 is a partial perspective view of the stationary frame 11.

The above-mentioned movable sleeve 12 is provided on its top and bottom with cam followers 17a, 17b, respectively, and in its left and right sides with elongate guide slits 12a, 12b (FIG. 2), respectively, linearly extending in parallel to the optical axis.

The cam followers 17a, 17b comprise pin-like rollers provided on their inner ends with key collars 18a, 18b secured thereto, respectively. These key collars 18a, 18b slidably move along the associated guide grooves 11a, 11b of the stationary frame 11. The previously mentioned guide slits 12a, 12b are adapted to guide respective cam followers provided on the movable frame 13 as will be described later.

The movable sleeve 12 carries around its front end a rotatable sleeve 19 helicoidally threaded thereon and a lens holder 20 for the movable lens group $L_2$ is secured by screws to this rotatable sleeve 19.

The rotatable sleeve 19 include a gear 19a integrally formed therewith so that this gear 19a is engaged with a focussing pinion 21 and thereby the movable lens group $L_2$ is position-adjusted as said rotatable sleeve 19 is rotated. A rotatable range of the sleeve 19 is limited by a go-round-lever axially extending from the lens holder 20 into the interior of the stationary frame 11.

The above-mentioned focussing pinion 21 is mounted on a supporting arm 23 which is, in turn, fixed to the movable sleeve 12 through a cam slot of the cam sleeve 14 so that said focussing pinion 21 is movable integrally with said movable sleeve 12.

Said movable sleeve 12 includes on its rear end said lens supporting frame 15 fastened by screws thereto and a lens holder 20 for the movable lens group L₃ is fastened by screws to said supporting frame 15.

Figure 7:
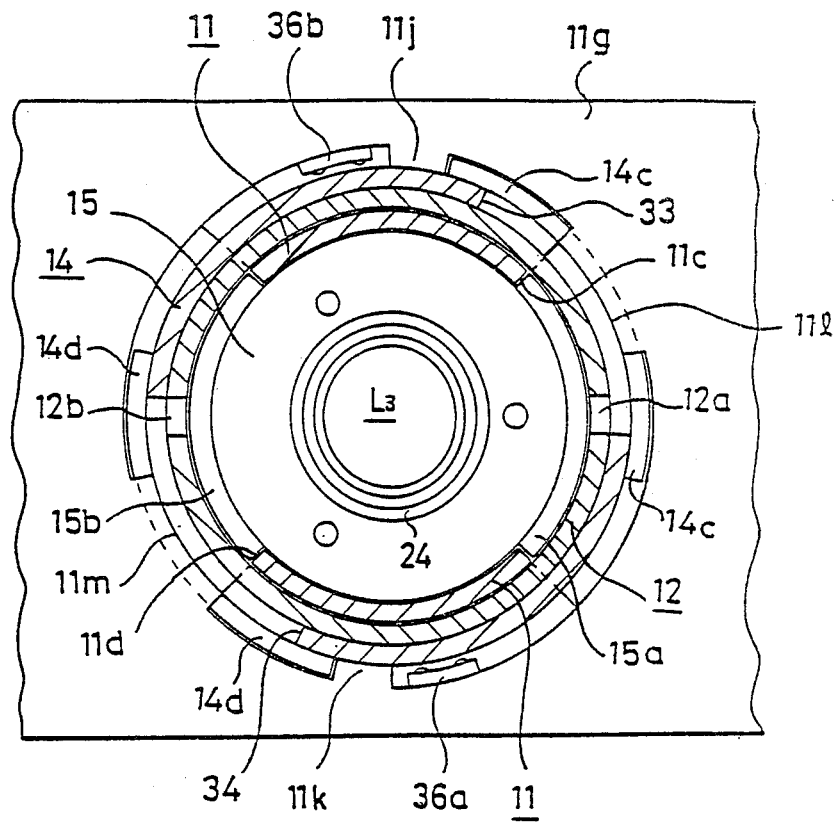
Figure 8:
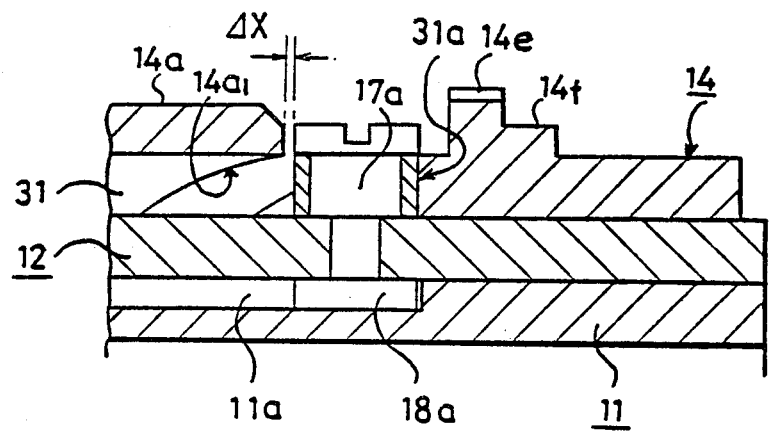

As best seen in FIGS. 3 and 7, the lens supporting frame 15 comprises a disc having, along laterally opposite portions of its periphery, arc-shaped diameter-enlarged segments 15a, 15b which are loosely inserted into the respective notches 11c, 11d of the stationary frame 11 in engagement with the inner periphery of the movable sleeve 12 and fastened thereonto by cap screws 25 (FIG. 2) threaded into small holes 12c formed in the movable sleeve 12 with interposition of a bushing.

FIG. 7 is the scale-reduced sectional view taken along the line A—A in FIG. 1.

The previously mentioned movable frame 13 comprises, as best seen in the perspective view of FIG. 3, a disc having, along laterally opposite portions of its periphery, arc-shaped diameter-enlarged segments and a central opening. The respective diameter-enlarged segments integrally define circumferentially curved surfaces 13a, 13b which carry, in turn, pin-like rollers, respectively, serving as cam followers 26a, 26b.

The rear disc-surface of said movable frame 13 on which said circumferentially curved surfaces axially extend carries a circular lens supporting frame 27 fastened thereto by screws, and this supporting frame 27 centrally carries a lens holder 28 for the movable lens group L₄.

As will be understood from FIGS. 1 and 2, the circumferentially curved surfaces 13a, 13b of the movable frame 13 are loosely inserted into the respective notches 11c, 11d of the stationary frame 11 while the cam followers 26a, 26b of said movable frame 13 are slidably engaged into the respective guide slits 12a, 12b of the movable sleeve 12 so as to bear against the cam surface of the cam sleeve 14.

The movable frame 13 are provided, as seen in the perspective view of FIG. 3, with a pair of stopper levers 13c, 13d extending in parallel to the optical axis. These stopper levers 13c, 13d extend through an arc-shaped through-hole 11f formed in the lens supporting portion 11e of the stationary frame 11 into the rotatable range of the go-round-lever 22 adapted to limit the rotatable range of the movable lens group L₂ so that said stopper levers 13c, 13d respectively bear against said go-round-lever 22 when the latter has gone round by a predetermined angular distance. There is provided between the lens supporting frame 27 fixed to said movable frame 13 and the lens supporting frame 15 fixed to the movable sleeve 12 a coil spring 30 so that, under an expanding effect of the latter, the movable frame 13 is normally biased leftwards as seen in FIGS. 1 and 2 while the movable sleeve 12 is normally biased rightwards as seen in the same figures.

In this embodiment, the movable frame 13 and the lens supporting frame 27 define therebetween a small gap in which shutter blades are incorporated.

As indicated by a chain line 29, a shutter drive is mounted on said lens supporting frame 27 so as to be located inside the circumferentially curved surfaces 13a, 13b.

Said cam sleeve 14 comprises a cylindrical body of synthetic resin material obtained by molding, which is, as seen in the perspective view of FIG. 3, provided on its front side with cam slots 31, 32 and on the rear side with cam slots 33, 34. The cam sleeve 14 is additionally provided therearound with substantially triangular covering plate portions 14a, 14b formed integrally with the cam sleeve 14 so as to cover the cam slots 31, 32, respectively. The covering plate portions 14a, 14b are respectively formed with cam-surface-parallel-walls 14a₁, 14b₁, extending in parallel to the respective cam surfaces 31a, 32a.

Figure 4:
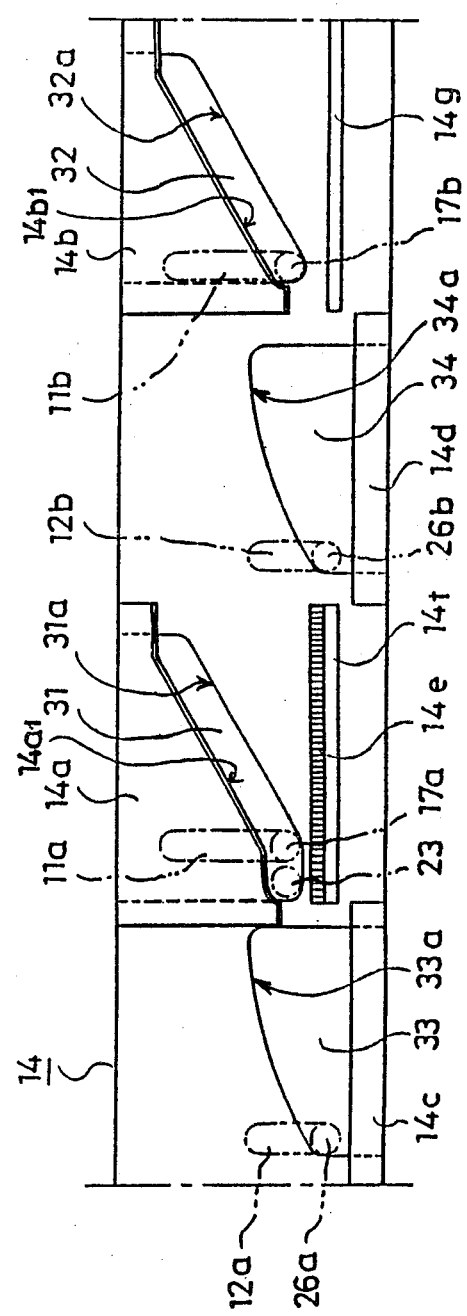

FIG. 4 is the developed view of said cam sleeve. As shown by this figure, the front cam slots 31, 32 respectively comprise notches axially extending from the front end of the cylindrical body at the top and the bottom, respectively, of which the linear oblique sides 31a, 32a define the respective cam surfaces while the rear cam slots 33, 34 respectively comprise notches axially extending from the rear end of the cylindrical body at the left side and the right side, of which the curved oblique sides 33a, 34a define the respective cam surfaces.

The cam sleeve 14 is integrally formed with the covering plate portions 14a, 14b therearound so as to cover the respective front cam slots 31, 32, respectively, as has previously been mentioned, and, in association with the rear cam slots 33, 34, there are formed flange portions 14c, 14d integrally with the cam sleeve 14 around its rear end. Said covering plate portions 14a, 14b are substantially triangular and their oblique sides define the cam-surface-parallel-walls 14a₁, 14b₁, extending in parallel to the cam surfaces 31a, 32a, respectively. These cam-surface-parallel-walls 14a₁, 14b₁ are radially enlarged above the cam surfaces 31a, 32a so that heads of the cam followers 17a, 17b may be brought into contact therewith. More specifically, when the user's finger exerts a force on the rotatable sleeve 19 so as to pull the latter forward with respect to the lens mount assembly, the cam followers 17a, 17b bear against the respective cam-surface-parallel-walls 14a₁, 14b₁, and thereby the movable sleeve 12 is blocked against further movement.

Figure 9:
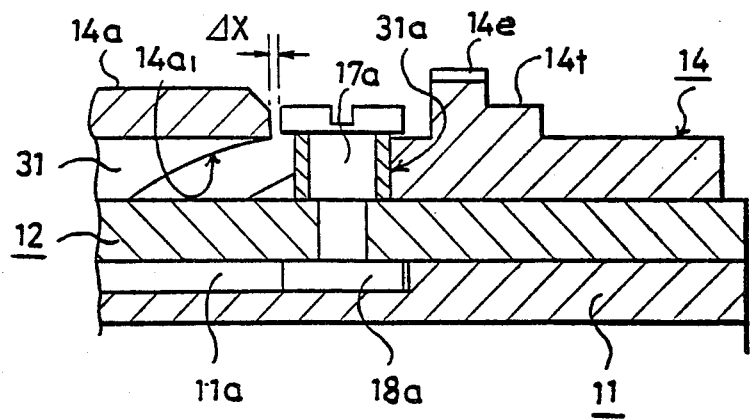

There are defined small gaps between the cam-surface-parallel-wall 14a₁ and the cam follower 17a, on one hand, and between the cam-surface-parallel-wall 14b₁ and the cam follower 17b, on the other hand, respectively, in order to assure that the cam followers 17a, 17b are normally prevented from coming into contact with the associated cam-surface-parallel-walls 14a₁, 14b₁. For example, such gaps between the cam-surface-parallel-walls and the associated cam followers are initially set to 0 to 0.2 mm, as indicated by ΔX in FIG. 8. It is also possible to regulate said gap ΔX between the respective cam-surface-parallel-walls and the associated cam followers, as seen in FIG. 9, by appropriately adjusting head diameters of set-screws for the cam followers. In this way, it will be advantageously possible to minimize ΔX substantially to "0" over the total length of each cam-surface-parallel-wall.

Said covering plate portions 14a, 14b serve in cooperation with said flange portions 14c to assure a true circularity of the cam sleeve 14. Said cam sleeve 14 is further provided therearound at its rear end but a little to its longitudinal middle with a gear portion 14e adapted to be engaged with a zooming pinion 35, as seen in FIG. 1. This zooming pinion 35 is carried by the mounting plate portion 11g of the stationary frame 11.

Said cam sleeve 14 is mounted on the stationary frame 11 in the bayonet fashion by engaging the flange portions 14c, 14d into the respective arc-shaped square groove defining portions 11h, 11i so as to be locked by the respective locking pawls 11l, 11m of the stationary frame 11. The cam sleeve 14 is axially positioned by engaging projections 14f, 14g integrally formed around the rear end of the cam sleeve 14 with surfaces of said locking pawls 11l, 11m.

As indicated by chain lines in FIG. 4, the cam followers 17a, 17b of the movable sleeve 12 bear against the respective cam surfaces 31a, 32a of said front cam slots 31, 32, and the cam followers 26a, 26b of the movable frame 13 bear against the cam surfaces 33a, 34a of said rear cam slots 33, 34. A circular chain line indicated within the front cam slot 31 represents together with the cam follower 17a a supporting arm 23 for the focussing pinion 21.

In assembling the previously mentioned zoom lens amount assembly, the movable frame 13 and the lens supporting frame 15 are mounted inside the stationary frame 11 with interposition of the coil spring 30, then the movable sleeve 12 is fit around the stationary frame 11, and the lens supporting frame 15 is fastened to said movable sleeve 12 by the cap screws 25.

Thereafter, the cam sleeve 14 is received around the movable sleeve 12 by inserting the rear end of the cam sleeve 14 into the arc-shaped square groove defining portions 11h, 11i of the stationary frame 11 with the flange portion 14c being interposed between the stopper projection 11k and the locking pawl 11l and the flange portion 14d being interposed between the stopper projection 11j and the locking pawl 11m, followed by rotating the cam sleeve 14 leftwards.

This causes the flange portion 14c to be advanced beneath the locking pawl 11l and the flange portion 14d to be locked beneath the locking pawl 11m, thus locking the respective flange portions 14c, 14d.

After thus having locked, the respective flange portions 14c, 14d, stopper pieces 36a, 36b are brought against the respective stopper projections 11j, 11k to prevent the flange portions 14c, 14d from slipping off. It should be understood that the stopper pieces 36a, 36b are secured to outer walls of the respective arc-shaped projections 11h, 11i as by means of screws or adhesive.

The cam sleeve 14 assembled in the above-mentioned manner now has its rotatable range limited, as will be apparent from FIG. 7, by the flange portion 14c being rotatable between the stopper projection 11j and the stopper piece 36a and the flange portion 14b being rotatable between stopper projection 11k and the stopper piece 36b.

The cam followers 17a, 17b and 26a, 26b are secured to the movable sleeve 12 and to the movable frame 13, respectively, after the cam sleeve 14 has been assembled, and then the rotatable sleeve 19 is threaded on the movable sleeve 12.

The above-mentioned zoom lens mount assembly functions as follows:

Assumed that the zoom lens mount assembly takes its wide angle position with the movable sleeve 12 having been retracted, as shown by FIGS. 1 and 2, the respective cam followers 17a, 17b, 26a, 26b take their positions relative to the cam sleeve 14 as seen in FIG. 4. Upon closure of a switch for zooming, the zooming pinion 35 is driven by an electromotor and thereby the cam sleeve 14 operatively associated with the pinion 35 is rotated clockwise as viewed from the front (i.e., the left hand of FIG. 1). With a consequence, the cam followers 17a, 17b forcibly moved by the associated cam surfaces 31a, 32a of the respective front cam slots 31, 32 and the movable sleeve 12 is moved leftwards as viewed in FIGS. 1 and 2 against the expanding effect of the coil spring 30. Simultaneously, the cam followers 26a, 26b are moved in parallel to the optical axis under the expanding force of said coil spring 30 as the associated cam surfaces 33a, 34a of the respective rear cam slots 33, 34. As a result, the movable frame 13 is moved leftwards as viewed in FIGS. 1 and 2.

During this movement, the key collars 18a, 18b integral with the cam followers 17a, 17b, respectively, are guided by the associated guide grooves 11a, 11b of the stationary frame 11 and thereby the movable sleeve 12 is unrotatably moved between the stationary frame 11 and the cam sleeve 14. Simultaneously, the gear 19a of the rotatable sleeve 19 threaded on the front end of said movable sleeve 12 is moved leftwards while maintained in engagement with the focussing pinion 21.

The movable frame 13 is slidably but unrotatably moved leftwards inside the stationary frame 11 with the cam followers 26a, 26b thereof being guided by the associated guide slits 12a, 12b formed through the movable sleeve 12 and the circumferentially curved surfaces 13a, 13b thereof being moved inside the associated notches 11c, 11d of the stationary frame 11.

Rotation of the cam sleeve 14 causes its flange portions 14c, 14d to be rotated rightwards as viewed in FIG. 7, and, when the cam sleeve 14 reaches a predetermined position, the ends of these flange portions 14c, 14d bear against the associated stopper pieces 36a, 36b to block the cam sleeve 14 against further rotation.

In consequence, the electromotor serving to drive the zooming pinion 35 is overloaded and the switch detecting this overload deenergizes the motor.

Figure 10:
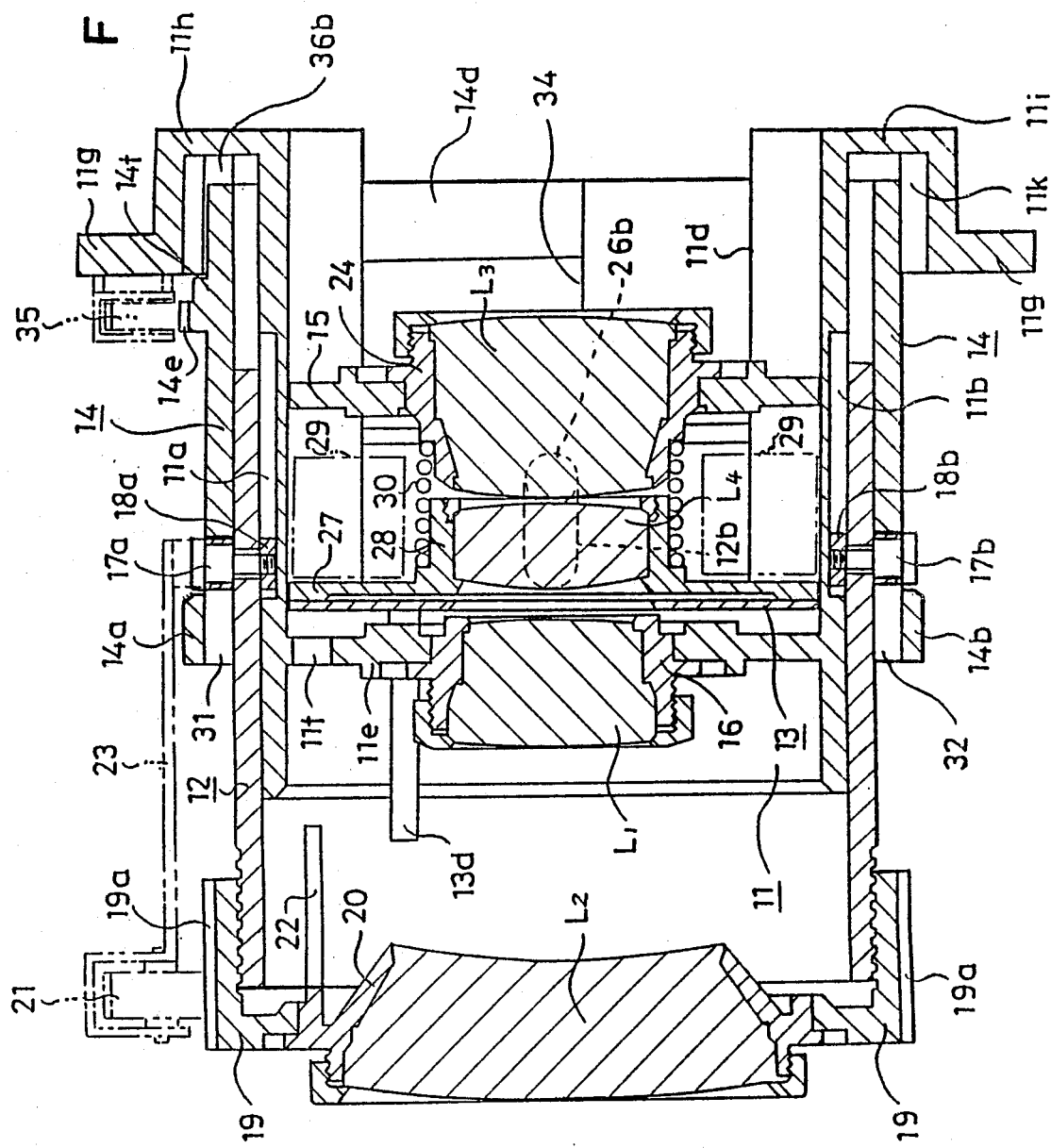

FIG. 10 shows the zoom lens mount assembly which has been brought by such zooming operation from the wide angle position to the telescopic position. As will be apparent from FIG. 10, the movable lens groups $L_2$, $L_3$ are displaced together by a same distance as the movable sleeve 12 is moved and movement of the movable frame 13 causes the movable lens group $L_4$ to be independently displaced by a shorter distance as said movable lens groups $L_2$, $L_3$.

Although the movement of the movable lens group $L_4$ can be selectively adjusted by configuration-varying the cam surfaces 33a, 34a of the respective rear cam slots 33, 34 formed in the cam sleeve 14, said cam surfaces 33a, 34a are configured in the practical design so that the distance of movement depends on a particular functional condition.

The focussing pinion 21 is driven by the electromotor included in an automatic range finder mechanism and rotates the rotatable sleeve 19 along the helicoidal thread. Rotation of this rotatable sleeve 19 causes a displacement of only the movable lens group $L_2$ in parallel to the optical axis and thereby controls its focussing.

When the rotatable sleeve 19 has reached a predetermined angular position, the go-round-lever 22 bears against any one of the stopper levers 13c, 13d to block the rotatable sleeve 19 against further rotation.

The electromotor serving to drive the focussing pinion 21 is thereby overloaded and the switch, upon detection of such overload, stops the electromotor or controls this electromotor to be reversely rotated.

For transfer from the telescopic position to the wide angle position, the zooming pinion 35 is driven for rotation in the direction opposite to that in the above-mentioned case. This rotation causes the cam followers 17a, 17b to be moved rightwards as viewed in FIG. 10, along the associated cam surfaces 31a, 32a of the front cam slots 31, 32 under the expanding force of the coil spring 30, on one hand, and causes the cam followers 26a, 26b to be forcibly moved by the associated cam surfaces 33a, 34a of the rear cam slots 33, 34 in the same direction. Thus, the movable sleeve 12 and the movable frame 13 take their operative positions as shown in FIGS. 1 and 2.

Although the invention has been described above in reference with one embodiment thereof, it is also possible to selectively increase or decrease the number of the front cam slots 31, 32 and the rear cam slots 33, 34 of the cam sleeve 14. Furthermore, in view of the fact that the covering plate portions 14a, 14b respectively bridging said cam slots 31 through 34 as well as the flange portions 14c, 14d are advantageous to maintain the true circularity of said cam sleeve 14, the covering plate portions 14a, 14b respectively covering the front cam slots 31, 32 may be continuously formed so as to extend completely around the sleeve.

It is also possible, as seen in FIGS. 11 and 12, that the covering plate portions 14a, 14b defining the respective cam-surface-parallel-walls $14a_1$, $14b_1$ are respectively prolonged to form corresponding rectangles.

FIGS. 13 through 16 illustrate one embodiment of the previously mentioned shutter blades and shutter drive mechanism 29.

Figure 13:
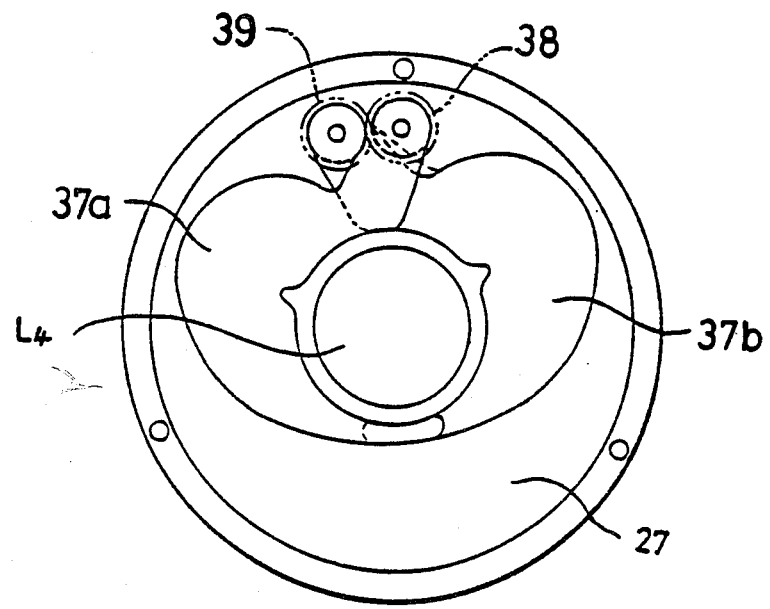
Figure 14:
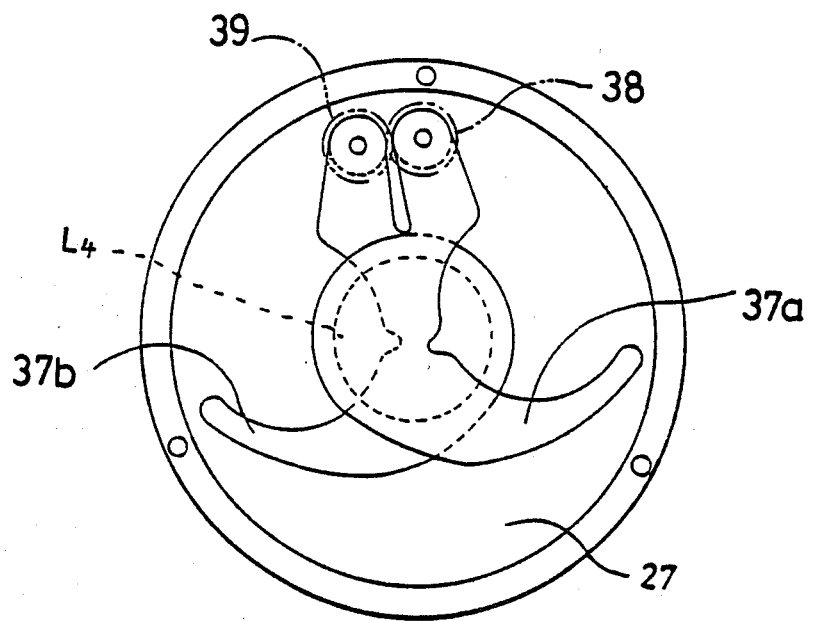

As will be apparently understood from FIGS. 13 and 14 showing the front (i.e., the left side as viewed in FIGS. 2 and 3) of the lens supporting frame 27 which has already been referred to, the shutter blade 37a is carried by a shaft of a main gear 38 provided on the rear side of the lens supporting frame 27 while the shutter blade 37b is carried by a shaft of an auxiliary gear 39 provided on the rear side of said lens supporting frame 27 so as to be operatively associated with said main gear 38. Accordingly, clockwise rotation of the main gear 38 causes the shutter blades 37a, 37b to be opened, as shown in FIG. 13 and counterclockwise rotation of said main gear 38 causes the shutter blades 37a, 37b to be closed, as shown by FIG. 14.

Figure 15:
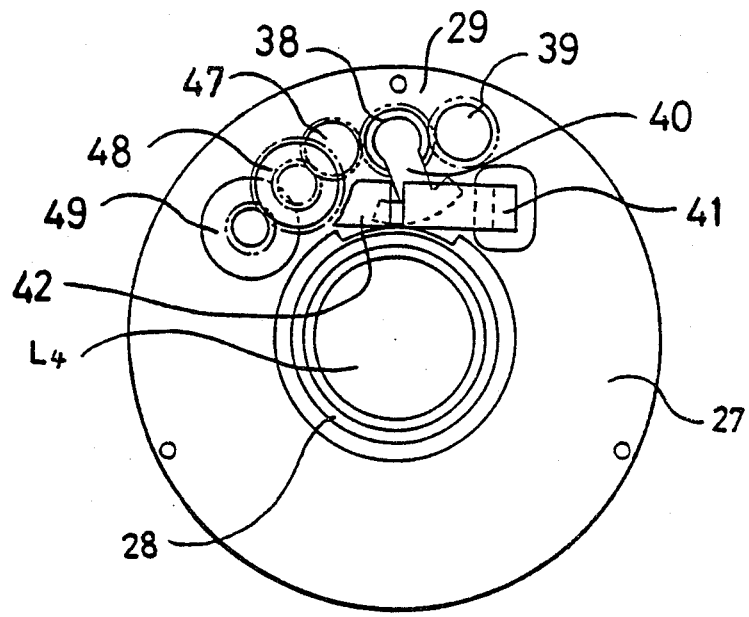

Said main gear 38 is rotationally driven by the shutter drive mechanism 29 shown by FIG. 15. It should be noted here that FIG. 15 illustrates the rear side of the lens supporting frame 27.

The shutter drive 29 comprises an electromagnetic mechanism which consists of a pendulum lever 40 made of magnetic material mounted on the shaft of said main gear 38 and a pair of electromagnets 41, 42.

Figure 16:
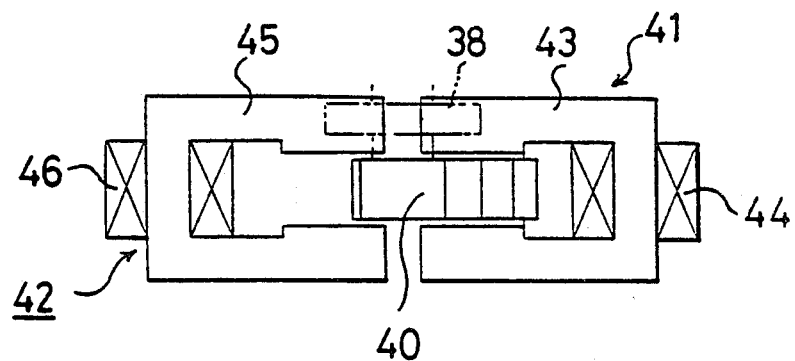

The electromagnet 41 consists of, as shown by FIG. 16, a laid-down square U-shaped core 43 and a coil 44 and, similarly, the electromagnet 42 consists of a laid-down square U-shaped core 45 and a coil 46. These electromagnets 41, 42 are opposed to each other with a predetermined spacing and fixedly mounted on the lens supporting frame 27.

Said pendulum lever 40 is substantially T-shaped, having its leg being pivotally mounted on the shaft of the main gear 38 so that its head may swing between the opposing ends of the respective cores 43, 45.

Gears 47, 48 and flywheel 49 serve together as a governor to stabilize operation of the shutter blades 37a, 37b.

The shutter mechanism mentioned above functions as follows:

Energization of the electromagnet 41 causes the pendulum lever 40 to swing counterclockwise as shown. The main gear 38 and the auxiliary gear 39 driven thereby cause the shutter blades 37a, 37b to be opened. Energization of the electromagnet 42 causes the pendulum lever 40 to swing clockwise to the symmetric position as shown and thereby the shutter blades 37a, 37b are closed again.

It should be understood that said shutter drive is not limited to the above mentioned particular arrangement but may be replaced by any suitable shutter drive of prior art.

FIGS. 17 through 20 illustrate a second embodiment of the present invention. Compared to the first embodiment described above, in which the innermost frame layer comprises the stationary frame 11 and the movable frame 13 with the circumferentially curved surface portions 13a, 13b received in the associated notches 11c, 11d of said stationary frame 11, the innermost frame layer comprises, according to the second embodiment, a movable sleeve 50 and a movable frame 51 having circumferentially curved surface portions 51a, 51b received in associated notches 50a, 50b of said movable sleeve 50.

Figure 18:
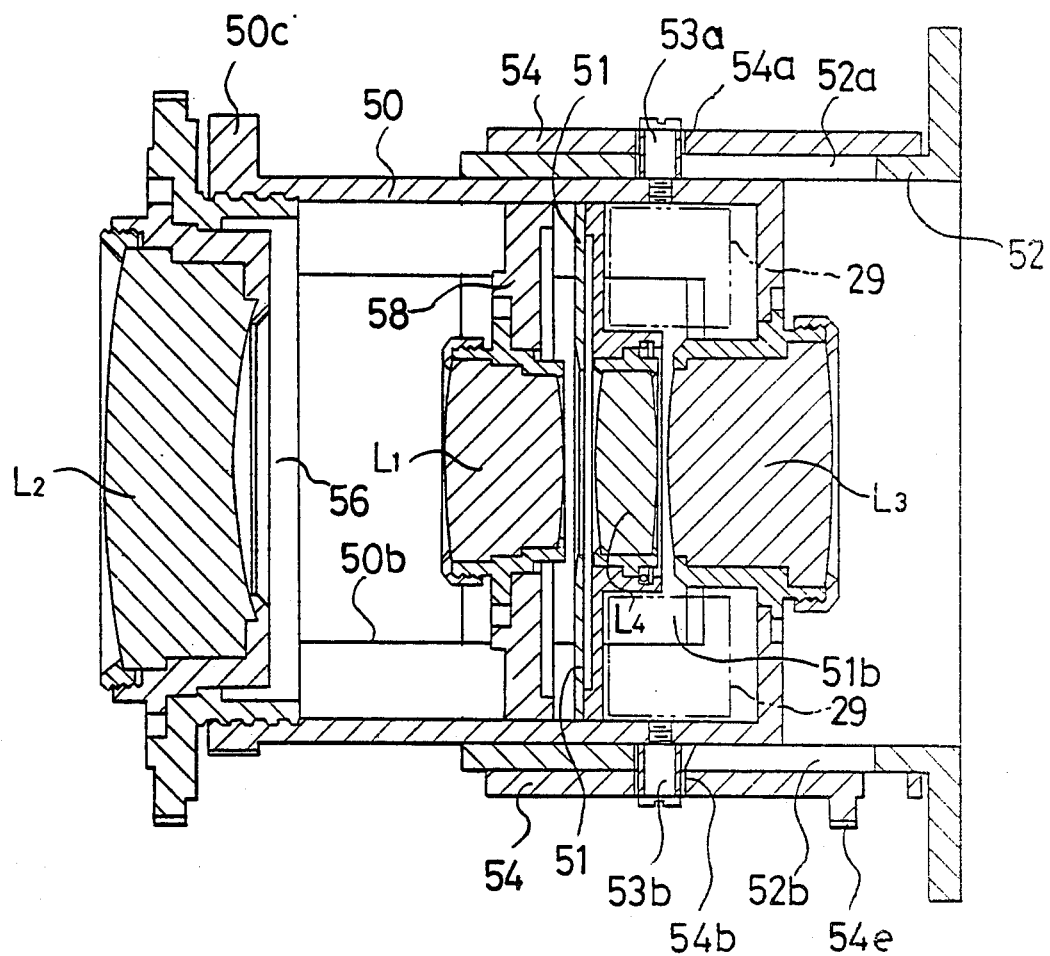

More specifically, the movable sleeve 50 is slidably supported inside a stationary frame 52 and cam followers 53a, 53b of the movable sleeve 50 extend through associated elongate guide slits 52a, 52b extending in parallel with the optical axis into respective cam slots 54a, 54b of a cam sleeve 54 (FIG. 18).

There are provided a rotatable sleeve 56 driven by a focussing pinion 55 on the front side and a movable lens group $L_3$ on the rear side of the movable sleeve 50, just as in the first embodiment.

Figure 17:
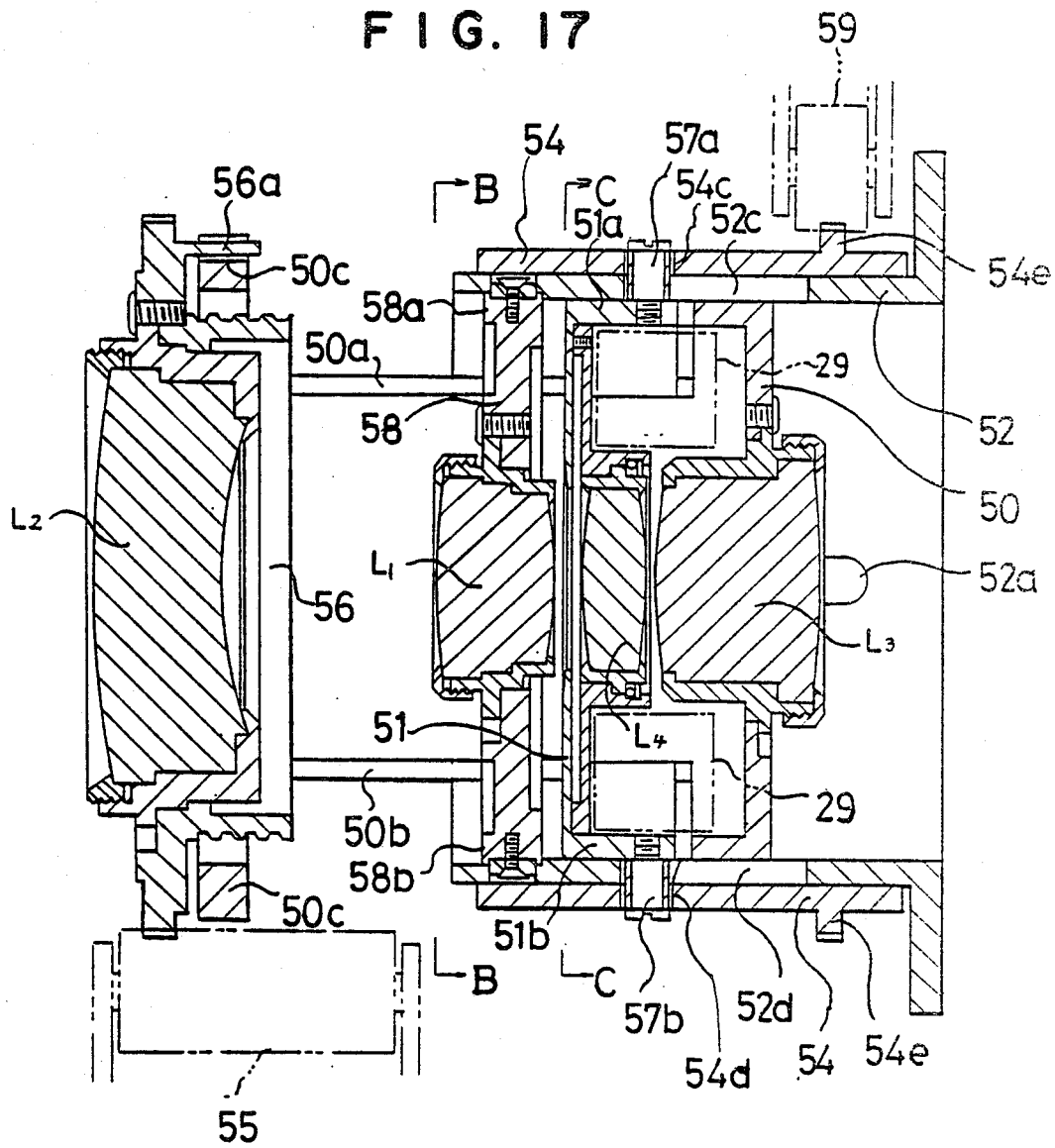

Said movable frame 51 is similar to the movable frame 13 in the first embodiment. As will be apparent from FIG. 20, the respective circumferentially curved surface portions 51a, 51b of the movable frame 51 are received in the associated notches 50a, 50b of the movable sleeve 50 and cam followers 57a, 57b of this movable frame 51 extend through linear guide slits 52c, 52d, respectively, of the stationary frame 52 into respective cam slots 54c, 54d of the cam sleeve 54 (FIG. 17).

Figure 19:
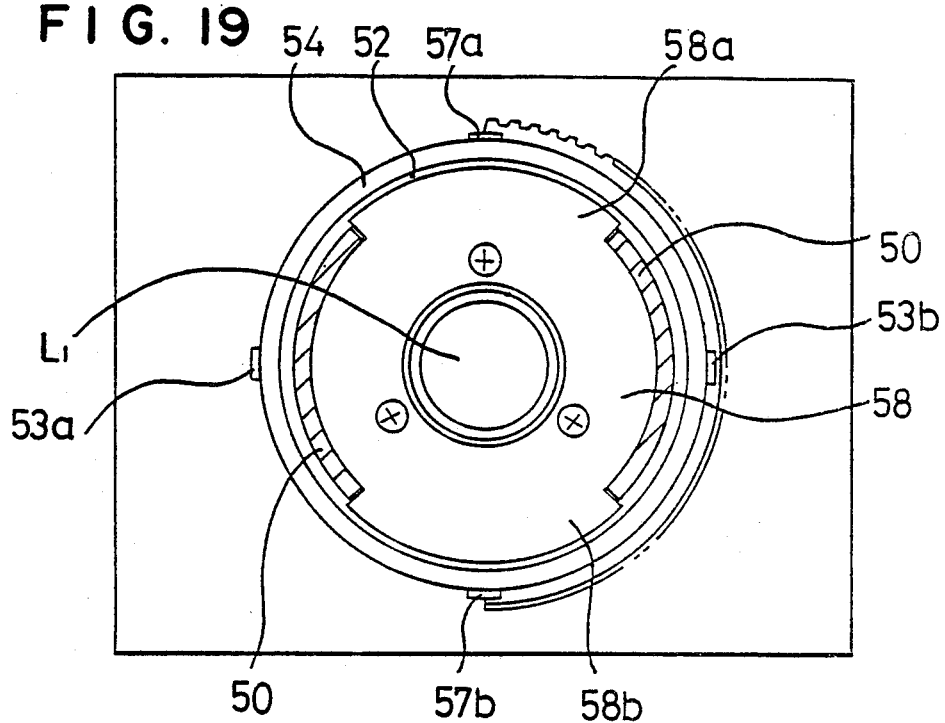
Figure 20:
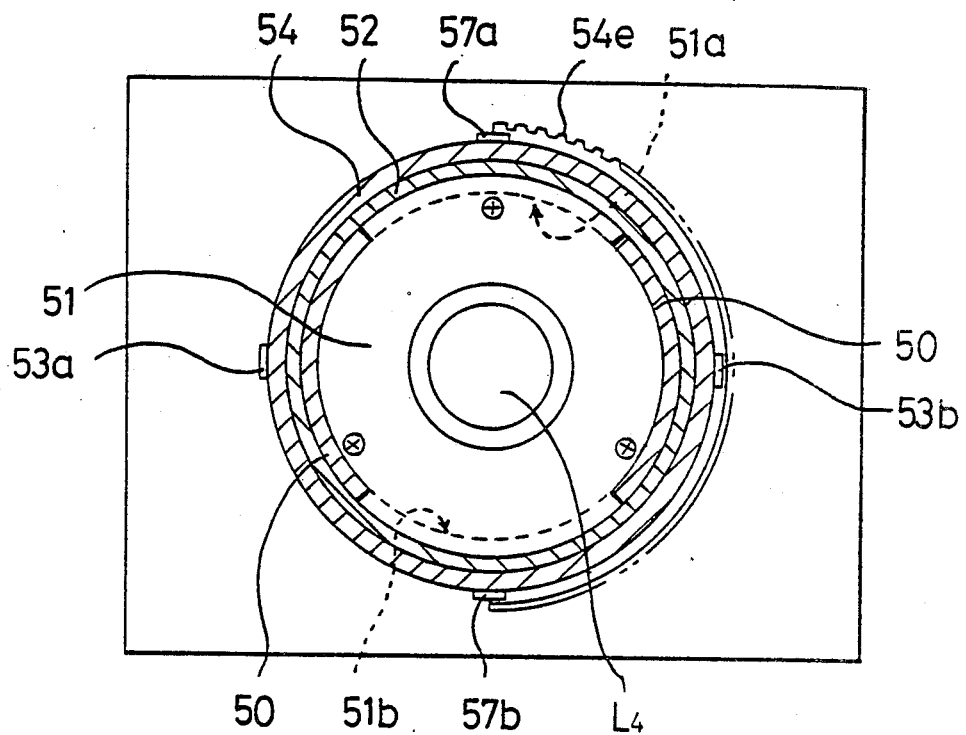

A lens supporting frame 58 provided on the front side of the stationary frame 52 includes, as best seen from FIG. 19, upper and lower arc-shaped diameter-enlarged portions 58a, 58b which project through the respective notches 50a, 50b of the movable sleeve 50 and secured by screws to the inner wall of the stationary frame 52.

The cam sleeve 54 includes elongate cam slots 54a to 54d extending circumferentially thereof and a gear portion 54e provided on the rear end but a little to the longitudinal middle so as to be engaged with a zooming pinion 59.

A projecting lever 56a provided on the rotatable sleeve 56 extends through an arc-shaped slit formed through a flange portion 50c on the front end of the movable sleeve 50 and serves to limit a rotatable range of the rotatable sleeve 56.

The zoom lens mount assembly according to the second embodiment functions as follows:

Rotation of the cam sleeve 54 by a driving force of the zooming pinion 59 causes the movable lens groups $L_2$, $L_3$, $L_4$ to be moved leftwards as viewed in FIGS. 17 and 18, and thereby the lens mount assembly is changed over from the telescopic mode as illustrated to the wide angle mode. Reverse rotation of said pinion 59 causes the lens mount assembly to be changed over again from the wide angle mode to the telescopic mode. The rotatable sleeve 56 may be rotated by a driving force of the focussing pinion 55 to achieve a desired focussing control.

When the zoom lens mount assembly according to the invention is used with a video camera, diaphragm blades may be interposed between the movable frame 13 and the lens supporting frame 27 in the place of the shutter blades.

Finally, the present invention may be also embodied as a zoom lens mount assembly in which both the cam sleeve and the movable sleeve are manually operated, without adopting the automatic zooming control mechanism operatively associated with the pinion (35, 59) and the automatic focussing control mechanism operative associated with the pinion (21, 55).

What is claimed is:

1. A zoom lens mount assembly comprising a stationary frame, a cam frame rotatable with respect to said stationary frame, and a plurality of movable frames each having at least one cam follower cooperating with respective cams of said cam frame so as to be moved along an optical axis in operative association with rotation of said cam frame, said stationary frame, said cam frame and said movable frames being assembled into a multi-layered frame structure in such a manner that said movable frames may be controllably moved to displace an optical system and thereby to vary an optical magnification, wherein at least two frame elements are combined in a single-layered structure to form an innermost frame layer, the innermost frame layer comprising a first frame element including at one end thereof at least two notches extending in parallel to the optical axis and spaced from one another by a predetermined distance and bridge portions between which the respective notches extend, and a second frame element including extension portions corresponding in number to said notches and extending from peripheral diameter-enlarged portions of said second frame element in parallel to the optical axis so as to be movably engaged into said notches of said first frame element.

2. A zoom lens mount assembly according to claim 1, wherein shutter blades are mounted on said second frame element and a shutter drive is provided inside said extension portions of said second frame element.

3. A zoom lens mount assembly comprising a stationary frame, a cam frame rotatable with respect to said stationary frame, and a plurality of movable frames each having at least one cam follower cooperating with respective cams of said cam frame so as to be moved along an optical axis in operative association with rotation of said cam frame, said stationary frame, said cam frame and said movable frames being assembled into a multi-layered frame structure in such a manner that said movable frames may be controllably moved to displace an optical system and thereby to vary an optical magnification, wherein said cam frame comprises a cylindrical body including at least one first cam slot on a front side in the form of a notch extending in parallel to the cylinder axis and opening at a front end of said cylindrical body so that an edge wall of said notch serves as a cam surface and at least one second cam slot on a rear side similarly in the form of a notch extending in parallel to the cylinder axis and opening at a rear end of said cylindrical body so that an edge wall of said notch serves as a cam surface; and wherein there is provided an expanding spring between a first and a second movable frames of said plurality of movable frames so that the at least one cam follower of said first movable frame is biased against said at least one first cam slot on the front side while the at least one cam follower of said second movable frame is biased against said at least one second cam slot on the rear side.

4. A zoom lens mount assembly according to claim 3, wherein said at least one first cam slot is angularly displaced with respect to said at least one second cam slot.

5. A zoom lens mount assembly comprising a stationary frame, a cam frame rotatable with respect to said stationary frame, and a plurality of movable frames each having at least one cam follower cooperating with respective cams of said cam frame so as to be moved along an optical axis in operative association with rotation of said cam frame, said stationary frame, said cam frame and said movable frames being assembled into a multi-layered frame structure in such a manner that said movable frames may be controllably moved to displace an optical system and thereby to vary an optical magnification, wherein said cam frame comprises a cylindrical body including at least one first cam slot on a front side in the form of a notch extending in parallel to the cylinder axis and opening at one end of said cylindrical body so that an edge wall of said notch serves as a cam surface and at least one second cam slot on a rear side similarly in the form of a notch extending in parallel to the cylinder axis and opening at a rear end of said cylindrical body so that an edge wall of said notch serves as a cam surface; wherein said cam frame is provided therearound with at least one covering plate portion adapted to cover at least one of said at least one first and second cam slots; and wherein said at least one covering plate portion is partially formed with a cam-surface-parallel-wall extending closely adjacent said at least one cam follower bearing against one of said cam surfaces.

6. A zoom lens mount assembly comprising a stationary frame, a cam frame rotatable with respect to said stationary frame, and a plurality of movable frames each having at least one cam follower cooperating with respective cams of said cam frame so as to be moved along an optical axis in operative association with rotation of said cam frame, said stationary frame, said cam frame and said movable frames being assembled into a multi-layered frame structure in such a manner that said movable frames may be controllably moved to displace an optical system and thereby to vary an optical magnification, wherein said cam frame comprises a cylindrical body including at least one first cam slot on a front side in the form of a notch extending in parallel to the cylinder axis and opening at a front end of said cylindrical body so that an edge wall of said notch serves as a cam surface and at least one second cam slot on a rear side similarly in the form of a notch extending in parallel to the cylinder axis and opening at a rear end of said cylindrical body so that an edge wall of said notch serves as a cam surface; wherein said cam frame is provided therearound with at least one flange adapted to bridge at least one of said at least one first and second cam slots; and wherein there is provided a mounting plate portion being integral with said stationary frame and having at least one square groove extending around a base of said stationary frame and at least one locking pawl extending into said square groove, and at least one stopper adapted to limit a rotatable range of said flange within said square groove after said flange of the cam frame has been engaged with said square groove, whereby the cam frame may be mounted in a bayonet fashion.

* * * * *